May 16, 1944.  F. H. ROHR  2,349,006
AIRPLANE POWER PLANT AND COWLING ASSEMBLY MEANS
Filed April 6, 1942  2 Sheets-Sheet 1

INVENTOR.
FREDERICK H. ROHR
BY
A. B. Bowman

May 16, 1944.　　　F. H. ROHR　　　2,349,006
AIRPLANE POWER PLANT AND COWLING ASSEMBLY MEANS
Filed April 6, 1942　　　2 Sheets-Sheet 2

INVENTOR.
FREDERICK H. ROHR
BY

Patented May 16, 1944

2,349,006

UNITED STATES PATENT OFFICE 2,349,006

AIRPLANE POWER PLANT AND COWLING ASSEMBLY MEANS

Frederick H. Rohr, San Diego, Calif., assignor to Rohr Aircraft Corporation, Chula Vista, Calif., a corporation of California Application April 6, 1942, Serial No. 437,778

6 Claims. (Cl. 29—39)

My invention relates to an airplane power plant and cowling assembly means, more particularly to a novel means to be used while assembling airplane engine power plants and cowling and the objects of my invention are:

First, to provide a means for supporting an airplane engine power plant on a substantially vertical axis so that the assembly parts may be readily assembled in connection therewith and the cowling readily assembled therearound;

Second, to provide a means of this class whereby such engine assembly may be shifted on the floor readily for various operations thereon;

Third, to provide a means of this class which has a part of its equipment jig members for placing certain of the parts of the assembly properly and for facilitating the drilling of holes for facilitating the assembly;

Fourth, to provide a means of this class in which the jig members may be readily removed after their function has been performed during the progress of assembly;

Fifth, to provide a means of this class for readily supporting the conventional airplane power plant assembly frame for receiving the power plant and accessories and cowling in progressive order as the assembly proceeds;

Ninth, to provide a means of this class which is very simple and economical to manufacture, easy to operate, efficient in its action and which will not readily deteriorate or get out of order.

Figure 1:
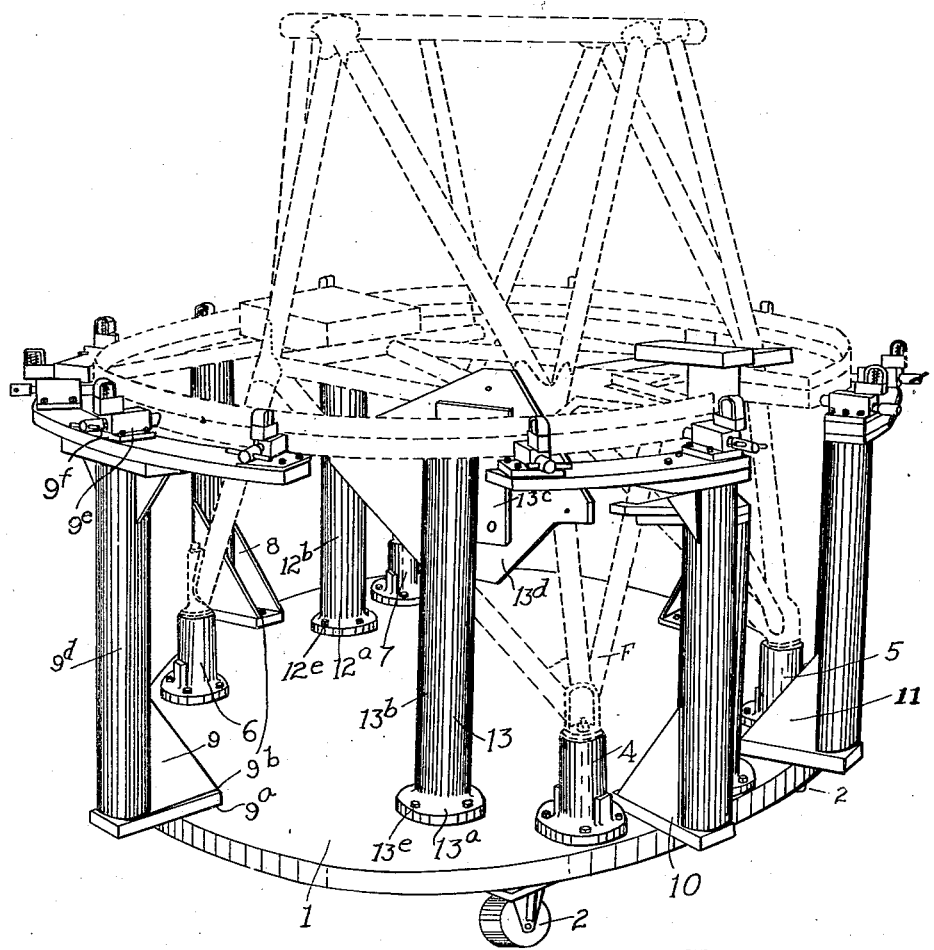
Figure 2:
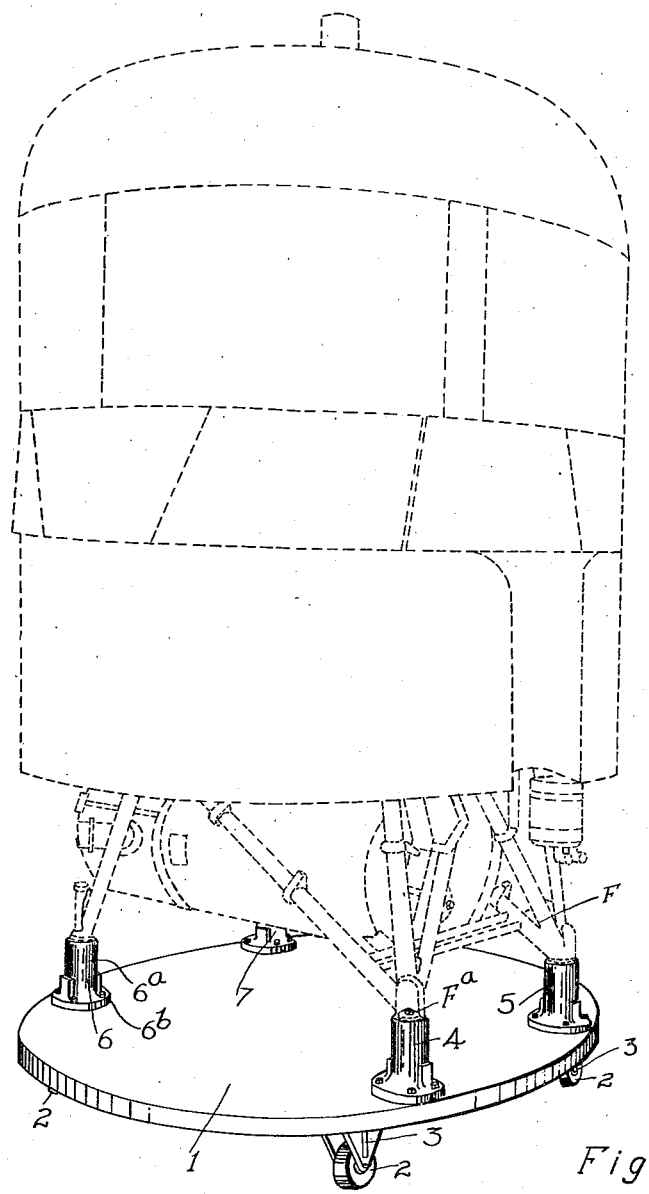

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is an isometric view of my means shown in connection with a portion of the power plant assembly frame shown in dash line and showing the means and the equipment used in the method at an early stage of the assembly and Fig. 2 is a similar view on a reduced scale to that of Fig. 1 showing the jigs and jig support removed or omitted and showing in addition the power plant cowling partially installed in connection with the power plant, all in dash line.

Similar characters of reference refer to similar parts throughout the views of the drawings:

The truck platform 1, truck rollers 2, truck roller brackets 3, assembly frame supports 4, 5, 6 and 7, outer line up jig members 8, 9, 10 and 11 and inner line up jig members 12 and 13 constitute the principal parts and portions of my airplane power plant and cowling assembly means.

The truck platform 1 may be any shape desired so that it has sufficient strength and is of a size to support the complete airplane power plant and cowling assembly and also the line up jig members in their relation to each other and the assembly frame. In this case I have shown it substantially circular and made of heavy plate so that it will not yield from unequal distribution of the load. In order that this platform is mobile and may be moved readily from place to place I have provided it with rollers 2 of which there are a plurality. In this case I have shown four. Each of these rollers is revolubly mounted in bifurcated brackets 3 which are preferably swiveled eccentrically in connection with the lower side of the platform 1 in castor form so that the truck formed by the rollers, brackets and platform may be readily shifted about on a floor from place to place so that work may be done on the different parts during assembly without inconvenience.

Secured on the upper surface of this platform 1 near its periphery and in proper spaced relation to each other for receiving the conventional airplane power plant assembly supporting frame F, as shown best in Fig. 2 of the drawings are the assembly frame supports 4, 5, 6 and 7 which extend upwardly some distance, preferably in cylindrical form as at 6a and secured to the platform by means of tap bolts 6b and their upper ends are provided with tappered holes adapted to receive tap bolts Fa for securing the leg members of the frame F rigidly to the platform 1, all as shown best in Fig. 2 of the drawings.

Secured to the upper surface of this truck platform 1 are a plurality of outer line up jig members 8, 9, 10 and 11, each of which comprises a base member 9a which is secured to the upper side of the platform 1 by means of tap bolts 9b. This base member 9a extends considerably past the outer edge of the platform 1. Secured on this overhanging portion 9c is a column member 9d which extends upwardly some distance and is preferably cylindrical in form as shown in Fig. 1 of the drawings. Mounted on the upper end of this column member 9d is a cylindrical member 9e in which is screw-threaded a bolt member 9f which is arranged to extend through the member 9e longitudinally and its opposite ends extend therefrom to provide means for adjusting the position of the frame member F2. This bolt member 9f is provided with a handle 9g to facilitate its turning.

It will be here noted that the jig members 8, 10 and 11 are of the same construction in detail as that described of the jig member 9 throughout. Therefore it will not be necessary to describe these other jig members in detail. It will be noted that they may be readily removed from the platform by removing the tap bolts 9b, it being noted that they are omitted in Fig. 2 of the drawings.

Positioned inwardly from the periphery of said platform 1 some distance are a pair of inner lineup jig members 12 and 13 which are preferably provided with annular base portions 12a and 13a with centrally disposed columns 12b and 13b.

Secured on the upper ends of these jig members 12 and 13 are jig plates for positioning the holes for connecting the parts in assembly. For instance, on the upper end of the column 13b is a plate 13c and to this is provided another several sided plate 13d. These plates are both for the purpose of positioning some of the members in assembly as well as jigs for properly positioning the holes for securing the assembled frame and other parts together. These jig members 12 and 13 are also readily removed by removing the tap bolt 12e and 13e, it being seen that they are omitted in Fig. 2 of the drawings.

It will be here noted that other jig members may be readily removably positioned on the platform 1, if desired, for use in connection with the accurate placing of the various assembly parts or portions of the airplane power plant, its accessories, cowling, etc., to facilitate the assembly, only the principal ones being shown in the accompanying drawings.

The operation of my means and the steps taken in my method of assembly are substantially as follows:

The truck consisting of the platform 1, rollers 2 and brackets 3 is rolled to a desirable position for use with the assembly frame support 4 in position, as shown in Fig. 2 of the drawings. The frame F is then positioned, as shown in Fig. 2 of the drawings. The frame F is then positioned on these supports and secured thereto as shown in Figs. 1 and 2 of the drawings. The jig members 8 to 13 are then positioned on the platform 1, as shown best in Fig. 1 of the drawings and the frame and other assembly parts are then properly positioned by the use of these jig members 8 to 13 inclusive so that the frame and its assembly parts are in proper alignment and position after which these jig members 8 to 13 are removed, as shown in Fig. 2 of the drawings and the power plant is then positioned and secured on the frame at its upper side after which the cowling and other outer parts are assembled over the power plant supported by the platform, as shown in Fig. 2 of the drawings. Thus it will be noted that by the use of the truck, the whole assembly is conducted by the use of jigs secured in their proper relation on the truck platform to properly position the frame and connecting parts, including the accessories and cowling in their proper continuity and the whole shiftable to various places for operation with the proper tools complete the assembly in its proper continuity all on a vertical axis.

Though I have shown and described a particular construction, combination and arrangement of parts and portions and a certain method of assembling airplane power plant and cowling assembly, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a combined airplane power plant support and cowling assembly means, the combination of a rigid plate, a plurality of relatively short power plant supports removably secured to the upper side of said plate and extending upwardly therefrom in substantially vertical position arranged to support said airplane power plant on a substantially vertical axis, a plurality of relatively long cowling positioning jig supporting members readily removably positioned on the upper surface of said plate, and cowling positioning jig members adjustably positioned on the upper ends of said jig supporting members.

2. In a combined airplane power plant support and cowling assembly means, the combination of a rigid plate, a plurality of relatively short power plant supports removably secured to the upper side of said plate and extending upwardly therefrom in substantially vertical position arranged to support said airplane power plant on a substantially vertical axis, a plurality of relatively long cowling positioning jig supporting members readily removably positioned on the upper surface of said plate, and readily detachable cowling positioning jig members adjustably positioned on the upper ends of said jig supporting members, said cowling positioning jig supporting members and said cowling positioning jig members being removed before finishing the assembly of said cowling.

3. In a combined airplane power plant support and cowling assembly means, the combination of a rigid plate, a plurality of relatively short power plant supports removably secured to the upper side of said plate and extending upwardly therefrom in substantially vertical position arranged to support said airplane power plant on a substantially vertical axis, a plurality of relatively long cowling positioning jig supporting members readily removably positioned on the upper surface of said plate, and cowling positioning jig members adjustably positioned on the upper ends of said jig supporting members, said cowling positioning jig supporting members and said cowling positioning jig members being removed before finishing the assembly of said cowling, said cowling positioning jig supporting members extending outwardly of the margin of said plate and secured thereon.

4. In a means for positioning and supporting a cowling on an airplane power plant, the combination of a rigid plate, means for securing an airplane power plant to the upper side of said plate on a vertical axis, a plurality of cowling positioning jig supporting members readily removably positioned on the upper surface of said plate, and a plurality of adjustable cowling positioning jig members positioned on the upper ends of each of said jig members.

5. In a means for positioning and supporting a cowling on an airplane power plant, the combination of a rigid plate, means for securing an airplane power plant to the upper side of said plate on a vertical axis, a plurality of cowling positioning jig supporting members readily removably positioned on the upper surface of said plate, and a plurality of adjustable cowling positioning jig members positioned on the upper ends of each of said jig members, said plurality of jig members being outer line-up jig members.

6. In a means for positioning and supporting a cowling on an airplane power plant, the combination of a rigid plate, means for securing an airplane power plant to the upper side of said plate on a vertical axis, a plurality of cowling positioning jig supporting members readily removably positioned on the upper surface of said plate, a plurality of adjustable cowling positioning jig members positioned on the upper ends of each of said jig members, said plurality of jig members being outer line-up jig members, and a plurality of inner line-up jig members readily removably secured to said plate inwardly of said outer line-up jig members.

FREDERICK H. ROHR.